July 10, 1962 S. S. FRIEDLAND ETAL 3,043,955
DISCRIMINATING RADIATION DETECTOR
Filed Jan. 25, 1960 3 Sheets-Sheet 1

STEPHEN S. FRIEDLAND,
JAMES W. MAYER,
JOHN S. WIGGINS,
INVENTORS

BY Charles I. Haughey
ATTORNEY

STEPHEN S. FRIEDLAND,
JAMES W. MAYER,
JOHN S. WIGGINS,
INVENTORS 3,043,955
DISCRIMINATING RADIATION DETECTOR
Stephen S. Friedland, Sherman Oaks, James W. Mayer, Pacific Palisades, and John S. Wiggins, Los Angeles, Calif., assignors to Hughes Aircraft Company, Culver City, Calif., a corporation of Delaware
Filed Jan. 25, 1960, Ser. No. 4,560
11 Claims. (Cl. 250—83.3)

This invention relates to the detection of nuclear particles. More particularly, the invention relates to detection of the effects produced by the passage through a semiconductor crystal of a charged particle, of the type having a rest mass and a velocity less than the speed of light, in a manner which discriminates between particles, and is characteristic of the initial, or incident, energy of the particles. Thus protons, alpha particles, beta particles and nuclear fission fragments may be detected, and by transferring energy from neutrons to nuclear particles, neutrons may also be detected.

The detection of nuclear radiation may be achieved in many well known ways, various systems being discussed in the text "Nuclear Radiation Detection," by W. J. Price, McGraw-Hill Book Company (1958). Such known systems for radiation detection have various individual shortcomings including complexity or size of equipment, inaccuracy, slow response, background noise, necessary environmental conditions such as low temperature, and the like.

Semiconductor crystal radiation detectors have been used, generally at very low temperatures to reduce thermal noise for detection of charged particle radiation. Such detectors have heretofore indicated with some precision the incidence of a radiation particle as it passed through a semiconductor crystal PN junction, as is illustrated in U.S. Patent to McKay, 2,670,441, but they have not heretofore served to accurately measure the incident energy of the radiated particle.

A most desirable application of radiation detectors is the detection and discrimination of alpha radiation from the characteristic monoenergetic radiation of radioactive materials. The alpha energy in million electron volts, mev., which is characteristic of known alpha emitters, varies generally from about 4.1 mev. for thorium ($Th^{232}$) to about 8.9 for polonium ($Po^{212}$), and over 9.1 mev. for actinium ($At^{213}$). Introductory Nuclear Physics, by Halliday, John Wiley & Sons, Inc., 1955 edition, pages 75 to 77, shows alpha disintegration energies in chart form. These characteristic radioactive values are well known, and the monoenergetic character of the alpha emission, if accurately measurable in an individual incident particle, would be a valuable tool in identifying both the character of a substance by the energy value, and its concentration by radiation intensity. It is also known that alpha decay may take place in a material through a succession of alpha emission steps, each of which results in characteristic alpha particle energy. Since the spectrum of alpha emission energies falls between about 4 mev. and about 9 mev., it is highly desirable to detect the incident energy of each alpha particle within this range.

It is, accordingly, a principal object of this invention to provide a discriminating radiation detector which proportionately distinguishes the energy of incident alpha particles in the range of from 4 to 9 mev.

Alpha particle radiation other than monoenergetic radiation from alpha emitters is also known, both from artificially accelerated alpha particles or helium nuclei and from cosmic energy. The measure of radiation energies of such particles may be required for slower particles in ranges less than 4 mev., and for faster particles in ranges exceeding 9 mev., and it is, accordingly, a further object of this invention to provide a discriminating radiation detector for measuring incident alpha particle energies in the ranges below 4 mev. and above 9 mev.

As an alpha particle passes through a semiconductor device, it produces electron-hole pairs, or charge carriers, which in number are proportionate to the energy lost by the particle in the passage. In accordance with the present invention, by establishing a reverse-biased PN junction in the device with a depletion region extending over substantially the entire path of the incident particle, the respective electrons and holes so formed are separated and swept by the bias field from the depletion region to produce a current of pulse shape proportional to the energy lost in the region. Such current pulses may be counted to establish the number of incident particles received, and their current may be measured to determine the incident velocity, or energy, of the particles. The intensity of each monoenergetic particle energy level may also be measured, and with suitable instrumentation may be displayed.

Other radiation particles, including nuclear fission fragments, produce similar reactions in semiconductor devices. Generally, any charged particle will produce ionization, or electron-hole pairs, as it passes through the crystal. When the radiation is of charged particles having a rest mass, a pulse having a current proportioned to the incident energy of the particle is obtained, provided the energy is substantially all released within the before-noted depletion region. In the case of neutrons, which are not charged particles, it is necessary to transfer the incident particle energy to other, charged, particles whose passage through the crystal produces the detectable effect. Thus for detection of neutron particles, a crystal is provided with a material to which the incident neutron particle may efficiently transfer its kinetic energy, to provide a detectable charged particle.

It is thus a further object to provide a radiation detector which discriminates the incident particle energies of a wide variety of radiation particles, and discriminates between individual incident radiation events, and produces or displays information as to such energies and events. The electrical pulse obtainable from the incidence of a given particle having a given initial, or incident, energy, upon entering a crystal detector, is determined by the energy required to form electron-hole pairs in the crystal. Since a finite energy transfer is required to form an electron-hole pair, the maximum pulse current is obtained when each electron-hole pair contributes thereto.

Semiconductor crystals are known to produce a current pulse from the passage of a charged particle through a reverse biased PN region, but heretofore such pulses were variable with bias voltage, and at constant bias voltage the current pulse height was not proportional to the incident energy of the particle. Further, particles of high mass, such as fission fragments, have not heretofore produced a substantial, or characteristic current pulse. It has been found that by producing a semiconductor crystal device having a PN junction which, when reverse biased, extends the depletion region substantially to the incident surface and sufficiently into the crystal, substantially all electron-hole pairs will then either be generated in or will diffuse to the depletion region substantially without recombination loss, and resolution of pulses according to their amplitude becomes extremely efficient. There are two components in such an electrical pulse: that of electron-hole pairs generated in the depletion region which separate so that electrons and holes drift rapidly to the respective N and P regions of the crystal; and that of the electron-hole pairs formed in the crystal outside the depletion region and which must diffuse to the depletion region to contribute to the current pulse. By forming the PN junction within 1 micron ($10^{-6}$ meters) of the surface, substantially all electron-hole pairs from the surface region diffuse to the depletion region before recombination, and in time to contribute to the current pulse. By extending the depletion region into the crystal beyond the penetration range of the incident particle, all electron hole pairs not formed in the initial, undepleted, surface will be formed within the depletion region where the electrons and holes rapidly drift to the respective P and N regions of the crystal to form the main, fast-rising portion of the current pulse. Thus the current pulse is the sum of electron-hole pairs which diffuse to the depletion region, which is a slow rising component of the pulse, and electron-hole pairs which are generated in the depletion region and by the drift mechanism form a fast rising component of the current pulse. The charge carriers formed within the depletion region are rapidly swept apart and out by the high electric field supplied by the bias, and the minority carriers which diffuse to the depletion region are then swept across the junction by the electric field therein.

It is, accordingly, an object of this invention to provide a semi-conductor PN junction crystal discriminating radiation detection system having a reverse biased PN junction within one micron of the incident surface, and having a depletion region extending into the crystal beyond the penetration range of monoenergetic particles generated by natural particle radiation emitters. Other objects and advantages of this invention will be apparent from the balance of this specification and the accompanying drawings forming a part thereof, wherein.

Figure 1:
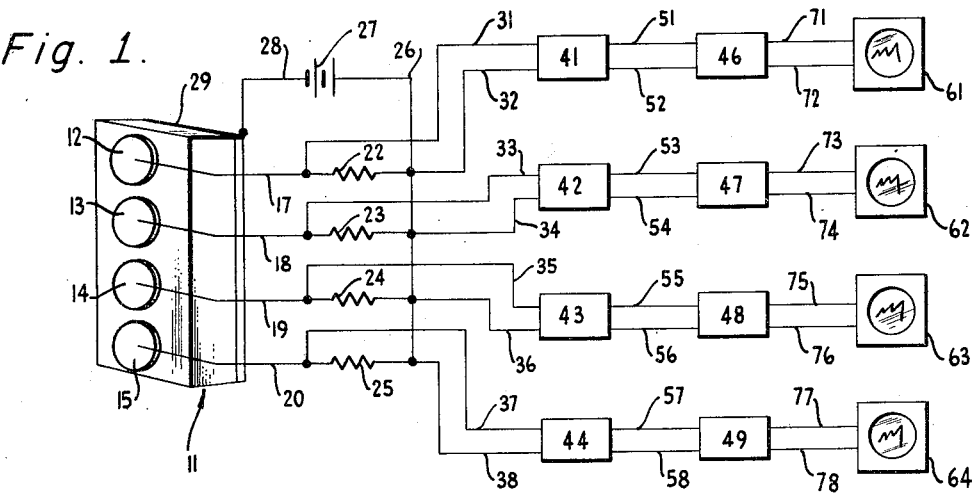
FIG. 1 is a schematic representation including a circuit diagram of a detector system according to this invention.

A discriminating radiation detector according to this invention is illustrated schematically in FIG. 1, in which a semiconductor detector crystal 11 contains a mosaic, or pattern, of mesas 12, 13, 14 and 15 each of which has been provided with an electrical conductivity type determining impurity, or dopant, to form in each mesa a PN junction. Each mesa is electrically connected by leads 17, 18, 19, 20 to circuit resistors 22, 23, 24 and 25, and in turn by a common lead 26 to a direct current voltage source such as a battery 27. The other terminal of the battery is connected by a lead 28 to a common contact electrode 29 on the reverse side of the crystal 11.

Each resistor is bridged by leads 31, 32, 33, 34, 35, 36, 37 and 38 to respective amplifiers 41, 42, 43 and 44, which in turn are connected to pulse height amplitude discriminators 46, 47, 48 and 49 by suitable leads 51 to 58. Information is preferably displayed on oscilloscopes 61 to 64, connected to the pulse height analyzer by leads 71 to 78.

In the operation of the apparatus of FIG. 1, a particle of very high energy may be directed to a target, not shown, which in turn radiates nuclear particles or fission fragments. The crystal 11 is positioned in fixed relation to the target so that each mesa 12, 13, 14 and 15 receives radiation from a different angle from the target.

When a charged particle, such as an alpha particle, enters the surface of a detector mesa 12, it produces electron hole pairs, by the well known ionization process, as it passes through the crystal. Some particles, such as alpha particles, produce proportionately more electron-hole pairs per unit distance at lower velocity than at higher velocity, hence it is of great importance to detect the effects of penetration of the particle through its entire path to obtain an indication of its incident energy.

As the charge carriers, electrons and holes, are swept from the junction on the mesa 12, a current pulse is caused to flow in the external circuit, causing a voltage pulse across the resistor 22. The voltage pulse is amplified by the amplifier 41, and the pulse height analyzer 46 registers another count of pulses of that amplitude, or height. The information displayed on the oscilloscope may then be the number of radiation events of each pulse amplitude plotted against pulse amplitude, or pulse height on the scale of the oscilloscope 61.

Since each detector mesa is at a different angular position with respect to the target radiation source, the differences in displayed information on the respective oscilloscopes reflect the incidence and character of particles penetrating the respective mesa junctions at their known positions.

Figure 2:
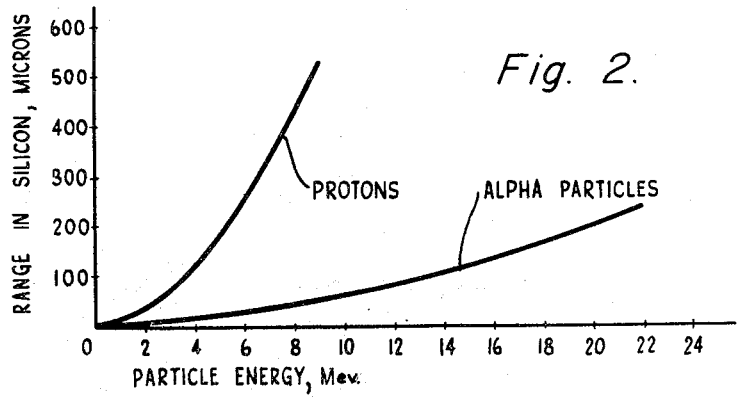
FIG. 2 is a chart of the penetration range of particles in silicon.

FIG. 2 shows the range of penetration of protons and alpha particles into a silicon semiconductor material, in microns, plotted against the initial, or incident energy of the particle. The range of heavier particles, such as fission fragments in silicon, would, of course, be less and would thus fall below the curve for alpha particles. In germanium crystals the range would be somewhat less, germanium having a greater mass.

The pulse height, or current amplitude, resulting from an incident particle, such as an alpha emission from radioactive decay, will be accurately measurable by a discriminating radiation detector system if it utilizes a reverse biased semiconductor PN junction whose depletion region extends from within a micron of the surface to at least a depth equal to the penetration range of the particle in the semiconductor crystal. For purposes of such a system, an undepleted surface layer is necessary for conducting charge carriers to and from the depletion region, forming an effective extension of an electrical lead or electrode to the crystal diode. If the undepleted surface layer of the crystal is too thick, charge carriers generated in the surface layer will recombine, and will not contribute to the current pulse. Hence the depletion region must be sufficiently close to the surface to avoid substantial recombination loss of charge carriers.

Figure 3:
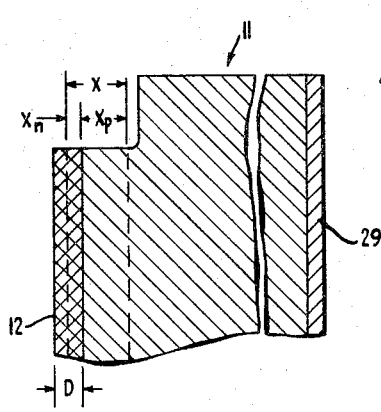
FIG. 3 is a schematic diagram of a fragmentary section of a PN junction of FIG. 1.

FIG. 3 shows a schematic cross-sectional view of the diode mesa 12 on the crystal 11 of FIG. 1. The original crystal material is an especially high resistivity or substantially intrinsic, material for reasons which will presently appear.

The crystal 11 may be made by starting with a P-type silicon semiconductor material having a resistivity of 1,000 ohm cm., and a predominant boron impurity. An N-type surface region is then formed by diffusing phosphorus, an N-type impurity material, into the crystal. This procedure is carefully controlled to produce a doped N-type region in the crystal about 1 micron ($10^{-6}$ meters) or less in depth, and may be done by exposure of the crystal surface to a phosphorus containing gas at about 950° C. for one hour. A mask is then placed on the crystal to cover the areas to be etched and a protective coating, such as etch resistant wax, is then applied to the areas where mesas are desired. The mask is then removed, and the uncoated portions are etched by an acid-type etchant to remove both the surface N-type layer and its underlying P-type material. The resulting structure is as shown in FIGS. 1 and 3, and requires only normal cleaning and the attachment of electrically conductive leads to each of the mesas and to the crystal back face, or P-type region.

When the crystal PN junction is reverse biased, a depletion region is formed about the junction of the P and N type regions of the crystal material. A depletion region is a region within the semiconductor crystal from which substantially all charge carriers have been removed under the influence of an electrical field. The depletion region X, as shown in FIG. 3, has two components, an $X_n$ portion extending into the N-type region of the crystal, and an $X_p$ region extending into the P-type region of the crystal. Thus the total depletion region X is:

$$X = X_n + X_p \tag{1}$$

The magnitude of $X_p$ or $X_n$ is given by the relation $$X = \left(\frac{\epsilon V}{2\pi q N_I}\right)^{1/2} \tag{2}$$

where V is the potential across the depletion region, $\epsilon$ is the dielectric constant of the crystal material (silicon), $q$ is the electronic charge, and $N_I$ is the concentration of ionized impurity centers, as is presented in "An Introduction to Junction Transistor Theory," by Middlebrook, published by John Wiley & Sons, Inc., pages 160 to 170. It will be observed that the ratio $X_p/X_n$ will be proportional to the square root of the inverse ratio of ionized impurity centers, or to the square root of the inverse ratio of the conductivities of the respective crystal regions; hence $$\frac{X_p}{X_n} \sim \left(\frac{\sigma_n}{\sigma_p}\right)^{1/2} \tag{3}$$

By diffusing sufficient N-type impurity material into the surface of a crystal for a distance D, a resistivity of $\sigma_n = .001$ ohm cm, may be obtained at the surface of the N-type region, and by using a crystal material having an initial or bulk resistivity, in P-type material, of $\sigma_p = 1,000$ ohm cm., the ratio of resistivities will be $$\frac{\sigma_n}{\sigma_p} = \frac{10^3}{10^{-3}} \text{ or } 10^6$$

and the ratio of depth of the depletion regions, $X_n/X_p$ by Equation 3 becomes $10^3$, or 1,000/1. With such a PN junction, the depletion region $X_p$ will extend 1,000 times further into the body of the crystal than the portion $X_n$ into the surface doped region. While this relationship presumes a uniform resistivity of the surface N region, in the usual case this resistivity is graduated from the bulk resistivity to the surface, and the extension of the depletion region toward the surface, $X_n$, increases on a decreasing semi-logarithmic scale with increase of reverse bias, whereas increase of $X_p$ is linear with such increased reverse bias. Thus the ratio $X_n/X_p$ will be considerably in excess of 1, but short of 1,000. The actual depth of the depletion region will of course depend upon the reverse bias voltage, but unless the resistivity of the crystal body is sufficiently high initially, the voltage must be raised so high that noise may interfere with the pulse signal.

With a penetration range in silicon, from FIG. 2, of the order of 50 microns for a 9 mev. alpha particle, it is necessary to reverse bias with sufficient voltage to produce this depth of depletion layer in the crystal. For protons, the range for the same initial energy is considerably greater and for fission fragments the range is considerably less.

To obtain a discriminating radiation detector, the pulse height or current amplitude obtained from an incident particle should be proportional to the incident particle energy over the range to be investigated. For monoenergetic alpha emission, the range of incident energies to be detected is 4 to 9 mev. Thus, on a plot of incident energy in mev. against relative pulse height, a straight line relationship is necessary for accurate identification of initial energies of the particle, hence accurate identification of the alpha decay process which produced the incident particle.

Figure 4:
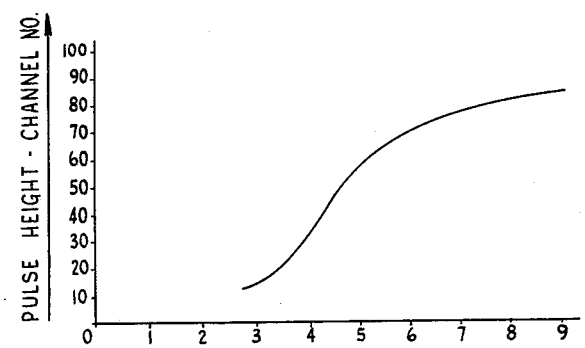
FIG. 4 is a chart showing pulse height versus alpha particle energy using an unsatisfactory diode.

FIG. 4 shows the relative pulse height versus alpha energy in mev. as measured by a 12 ohm-cm. resistivity silicon crystal having a diffused PN junction 12 microns below the incident crystal surface. The response to low energy particles of about 3 to 4 mev. is poor, due to loss of ionized particles in the surface layer due to recombination, and the response to particles of energies above about 6 mev. is poor due to loss of charge carriers beyond the depletion region. Hence at neither end of the scale is this crystal adequate to produce the necessary straight line relationship.

Figure 5:
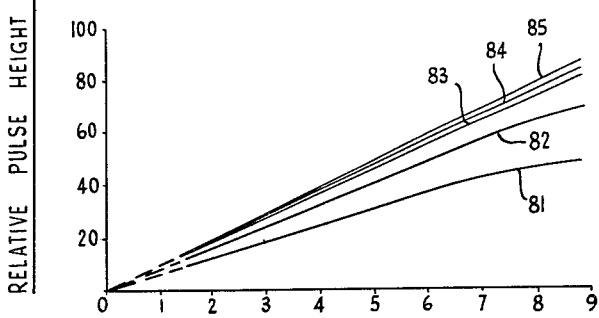
FIG. 5 is a chart showing pulse height versus alpha particle energy using a very superior diode.

FIG. 5 shows several curves for varying bias voltage of relative pulse height versus alpha particle incident energy made with a detector crystal of P-type silicon of 1,000 ohm-cm. resistivity doped with phosphorus to produce an N-type region less than 1 micron below the surface. Curves 81, 82, 83, 84 and 85 were made with respective reverse bias of 0 volt, 1.5 volts, 10.5 volts, 45 volts, and 205 volts. With very low resistivity in the N-type region, and a corresponding high resistivity in the P-type region a very deep depletion region is obtainable which extends so near the incident particle surface that, for substantially any voltage of reverse bias, the pulse height curve appears to pass through the zero point. This is the characteristic which results from extending the junction, or the surface boundary of the depletion region, to within 1 micron of the crystal surface, so that loss of charge carriers due to recombination in the surface layer before diffusion to the depletion region is negligible.

It is noted that the lower curve 81 in FIG. 5 is not linear above 8 mev., and at some higher particle energy the curve would become horizontal, or drop again. It is linearity that is required for a suitable detector system. Hence, even though a crystal is properly fabricated, with a very shallow surface PN junction within 1 micron of the surface, and with a sufficient ratio of resistivities in the P and N regions, it is still necessary to apply the proper reverse bias to generate a current pulse proportional to the incident particle energy.

Figure 6:
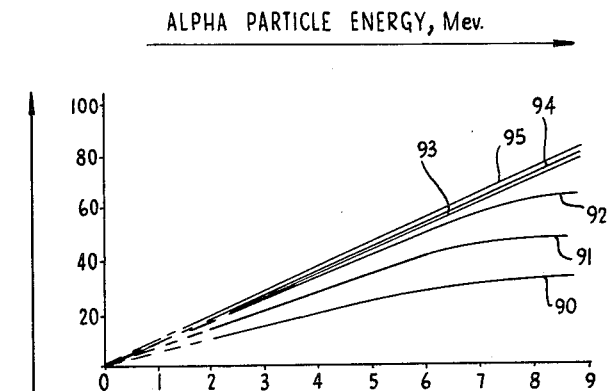
FIG. 6 is a chart showing pulse height versus alpha particle energy using a second diode.

FIG. 6 shows relative pulse height versus alpha particle energy in mev. for the incident particle for a series of reverse bias voltages. Curves 90, 91, 92, 93, 94 and 95 were made with reverse bias of 0.0, 1.5, 10.5, 45, 91, and 205 volts. The crystal used was made from initially P-type 300 ohm-cm. resistivity silicon, with an N-type region formed from diffusing phosphorus less than 1 micron into the incident surface. As with the 1,000 ohm cm. material, the straight line proportionality range extends from substantially zero energy to above 9 mev. for a reverse bias of 45 volts or more.

It is thus clear that with a detector crystal having a PN junction within 1 micron of the particle incident surface, substantially no loss of current due to the surface layer is encountered. By using a crystal of sufficient purity that the ratio of resistivities is in excess of about $10^6$, the ratio of the depth of depletion region is of the order of $10^3$ or greater, and the depletion region will upon proper reverse bias extend into the crystal beyond the range of monoenergetic alpha particles from nuclear radiation sources, and linear data are obtainable in pulse height versus particle energy tests.

When a PN junction is formed in a high resistivity semiconductor material by heavily doping a surface portion, as hereinbefore described, and especially with a graded doping as occurs in a diffusion process, the number of impurity centers in the surface portion is so great that beyond the depletion range from a relatively low reverse bias voltage, there is little change in the depletion region boundary. If it is considered that in reverse biasing a PN junction, a substantially equal number of charge carriers, electrons or holes, is swept from each side of the junction, then it is more easily appreciated that the depletion region must advance far into the base crystal to find charge carriers to counter-balance those in the heavily doped surface region. It is then equally possible to utilize an intrinsic crystal, or one of either P or N type, and to diffuse a P-type impurity into one surface and an N-type impurity into the other surface and then apply sufficient reverse bias to sweep all charge carriers from the intrinsic, or high resistivity, region, and the thinner the base crystal the less resistivity is required to accomplish this result. With crystals having an initial base resistivity of the order of 100 ohm cm. or greater, "intrinsic" regions substantially deeper than the range of natural monoenergetic alpha particles may be swept of charge carriers if the respective surfaces are suitably doped. Accordingly, so long as the indicent surface is heavily doped to less than one micron depth, a P-I-N junction device under adequate reverse bias voltage provides a fine discriminating detector crystal.

When a discriminating crystal detector has been suitably formed and reverse biased as herein taught, the result of the proximity of the depletion layer to the incident particle surface, the negligible loss of charge carriers from the current pulse resulting from incident particles makes possible yet another type of measurement with the solid state, semiconductor device.

Fission fragments, due to their relatively high mass, have a very short range in silicon and other semiconductor crystals compared to protons and alpha particles. Their energy is transferred to the crystal by ionization formation of electron-hole pairs as is the case with alpha particles, but their large energies are thus lost within a small distance of penetration. Thus, for a characteristic pulse to be obtained, the depletion region must extend to within one micron of the surface, and for improved resolution, preferably less than one micron of the surface.

Figure 7:
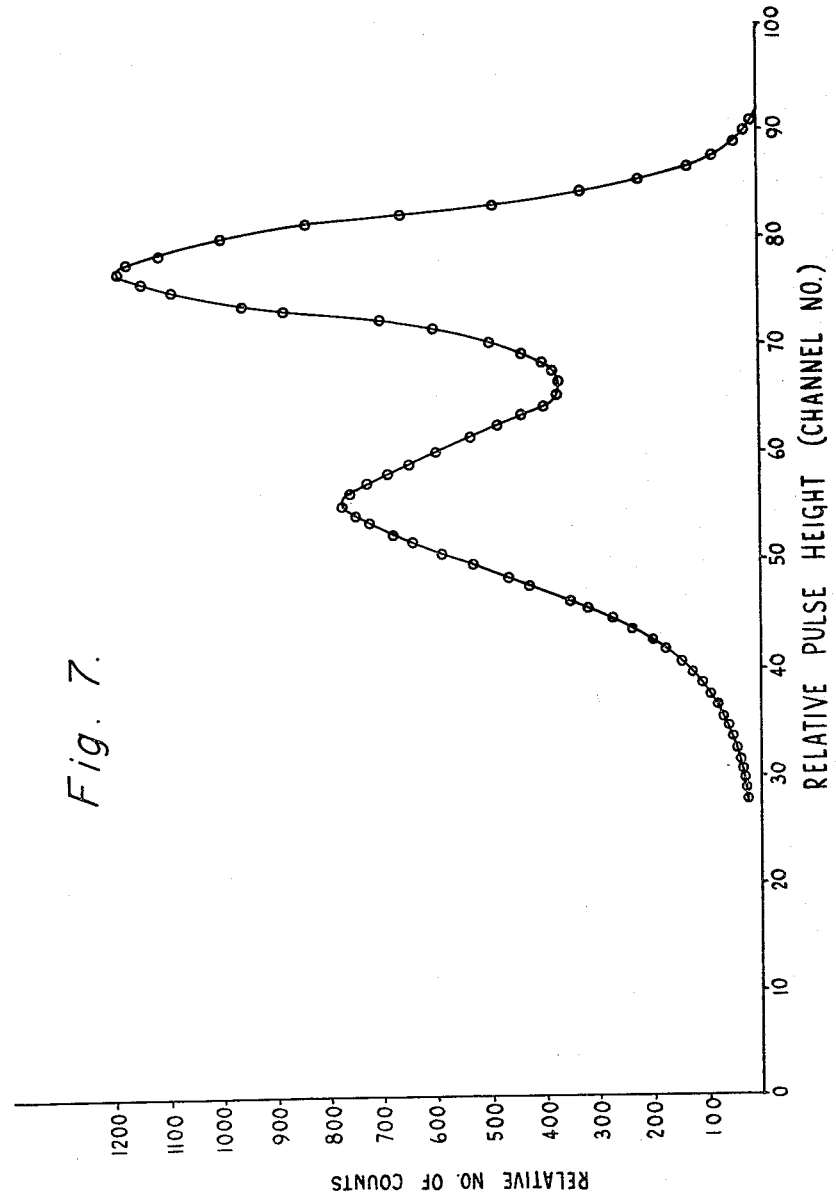
FIG. 7 is a chart of the spontaneous fission spectrum of $Cf^{252}$.

FIG. 7 shows the spontaneous fission spectrum of californium, $Cf^{252}$, as measured by a diode 12 of the crystal 11, FIG. 1. The current pulses from each fission event, due to impingement of a particle or fission fragment on the crystal surface, are amplified in an amplifier 41, and the number of pulses of each energy or current amplitude in the range measured is then indicated through the pulse height analyzer 46 and displayed on the oscilloscope 61. The resulting picture is shown in FIG. 7. The ratio of the two peaks in the curve so measured was 1.4 as shown in FIG. 7. Since the pulses to be measured have a rise time much faster than present known amplifiers can follow, it is presumed that further improvement is possible with the crystal detectors as herein described.

By use of a mosaic of detectors as shown in FIG. 1, with suitable circuits, it is possible to simultaneously measure radiation at precisely located points in space to obtain spectrum information. It should also be noted that the surface, or near surface, of a semiconductor crystal detector may be coated with a material which is sensitive to neutron radiation, which receives incident neutron particles and transfers their kinetic energy to charged particles. The pulse resulting from such charged particles is then measurable to indicate incident neutron particle energy. Since the penetration range of neutron particles in silicon is great as compared to the range of charged particles, it has been possible to obtain substantial resolution of energy by diffusing such neutron sensitive material into the area of the depletion region. For example, $B^{10}$, $U^{235}$ or $U^{238}$ would be suitable for this purpose.

What is claimed is:

1. An alpha particle radiation detector comprising: a silicon semiconductor crystal having a PN junction within one micron of the incident particle surface; and a ratio of bulk crystal resistivity to incident particle surface resistivity of $10^6$ to 1.

2. A radiation particle detector comprising: a silicon semiconductor crystal having a PN junction sufficiently near the incident surface that loss of charge carriers created by incident particles between the junction and the incident surface is negligible; said crystal having a base resistivity of at least 100 ohm cm.; and means for applying reverse bias to the junction.

3. A radiation particle detector for detecting monoenergetic alpha particle, comprising: a silicon semiconductor crystal having an incident particle surface for receiving the particles; a PN junction in said crystal within one micron of said surface; said crystal having a ratio of base resistivity to incident surface resistivity of at least $10^6$ to 1; and means for applying reverse bias to said junction.

4. A radiation particle detection system comprising: a silicon semiconductor crystal having a particle incident surface, a PN junction within one micron of said surface, and a base to surface resistivity ratio of at least $10^6$ to 1; a resistor; circuit means for reverse biasing said junction serially connected with said resistor; an amplifier connected across said resistor; and means coupled to said amplifier for displaying current pulses developed by said system.

5. A radiation particle detector system according to claim 4 and comprising a pulse height analyzer for segregating pulse according to their individual magnitudes.

6. A charged particle detector comprising: a semiconductor crystal having: an incident particle surface; a PN junction parallel to and sufficiently near the incident particle surface that loss of charge carriers created by incident particles between the surface and the junction is negligible; said crystal having a base resistivity of at least 100 ohm cm.; and means for applying a reverse bias to the junction.

7. A charged particle detector comprising: a semiconductor crystal having: an incident particle surface; a PN junction parallel to and sufficiently near the incident particle surface that loss of charge carriers created by incident particles between the surface and the junction is negligible; a ratio of bulk crystal resistivity to incident particle surface resistivity of $10^6$ to 1; and means for applying a reverse bias to the junction.

8. A radiation particle detection system comprising: a semiconductor crystal having a particle incident surface, a PN junction within one micron of said surface, and a base to surface resistivity ratio of at least $10^6$ to 1; a resistor; circuit means for reverse biasing said junction serially connected with said resistor; an amplifier connected across said resistor; and means coupled to said amplifier for displaying current pulses developed by said system.

9. A radiation particle detector system according to claim 8 and comprising a pulse height analyzer for segregating pulses according to their individual magnitudes.

10. A device for detecting charged nuclear particles including nuclear fission products and for discriminating between particles of different energies, said device comprising a semiconductor crystal having a PN junction within about 1 micron of a surface where the charged particles are incident, the ratio of the resistivity of the bulk crystal to that of said incident particle surface being of the order of $10^6$ to 1, means including a pair of electrodes for applying a reverse bias to said junction, and further means coupled to said electrodes for developing current pulses in response to the incidence of charged particles and for distinguishing the current amplitude of said pulses, thereby to detect the charged particles and to discriminate between particles of different incident energies.

11. A device for detecting charged nuclear particles including nuclear fission products and for discriminating between particles of different energies, said device comprising a silicon semiconductor crystal having a PN junction within about 1 micron of a surface where the charged particles are incident, the ratio of the resistivity of the bulk crystal to that of said incident particle surface being of the order of $10^6$ to 1, means including a pair of electrodes for applying a reverse bias to said junction, and further means coupled to said electrodes for developing current pulses in response to the incidence of charged particles and for distinguishing the current amplitude of said pulses, thereby to detect the charged particles and to discriminate between particles of different incident energies.

References Cited in the file of this patent

UNITED STATES PATENTS

| | | |
|---|---|---|
| 2,629,800 | Pearson | Feb. 24, 1953 |
| 2,650,311 | Bray et al. | Aug. 25, 1953 |
| 2,670,441 | McKay | Feb. 23, 1954 |
| 2,753,462 | Moyer et al. | July 3, 1956 |
| 2,760,078 | Youmans | Aug. 21, 1956 |
| 2,885,562 | Marinace et al. | May 5, 1959 |
| 2,909,662 | Von Hippel et al. | Oct. 20, 1959 |
| 2,935,711 | Christensen | May 3, 1960 |
| 2,942,110 | Lehovec | June 21, 1960 |